July 3, 1923.
A. FTYKLO
1,460,412
NUT LOCK
Filed April 18, 1922
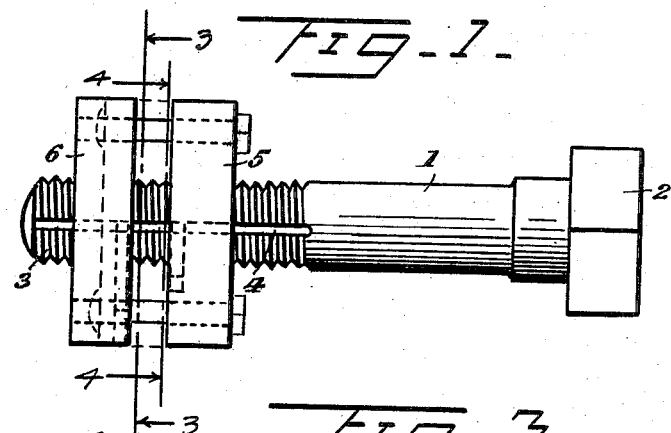
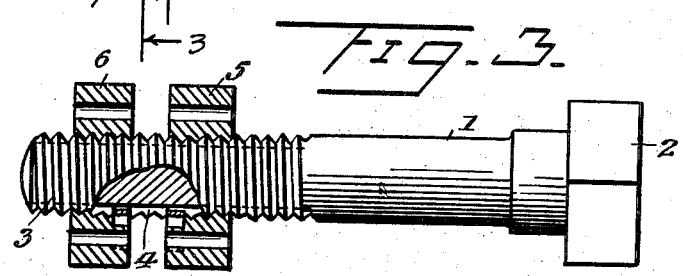
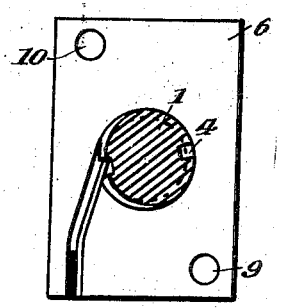
Inventor
Andy Ftyklo.
By William J. Jacobi
Attorney Patented July 3, 1923.

1,460,412

UNITED STATES PATENT OFFICE.

ANDY FTYKLO, OF BRAZNELL, PENNSYLVANIA.

NUT LOCK.

Application filed April 18, 1922. Serial No. 554,804.

*To all whom it may concern:*

Be it known that ANDY FTYKLO, a citizen of the Republic of Poland, residing at Braznell, in the county of Fayette and State of Pennsylvania, has invented certain new and useful Improvements in Nut Locks, of which the following is a specification.

This invention relates to nut locks and has for its primary object to provide an especially constructed nut in combination with a bolt that will prevent the nut from being jarred from the bolt by vibration or other causes.

A further object of my invention is to provide a composite nut which can be securely locked on the thread of a bolt at any point, thus eliminating the necessity of always screwing the nut up against the base of the object to be held.

A still further object of my invention is to provide a composite nut lock of the above stated character comprising a pair of nuts, each of which carries a spring pawl adapted to hold the nut or nuts from reverse rotation on the bolt when same is screwed onto a bolt, and each of the nuts provided with an aperture at opposite corners so that the said nut can be so arranged on the thread of a bolt that the apertures will be brought to aline with each other and a pin or bolt may be passed through said apertures and securely lock not only the nut on the bolt but lock the nut in a spaced relation with each other.

An additional object of my invention is to provide a bolt having diametrically disposed longitudinal grooves in the thread of the bolt adapted to receive therein the spring pawls in each of the nuts.

Another object of my invention is to provide a nut lock of the above stated character which is not only simple in operation and construction, but is durable, efficient for the purpose intended and one that can be manufactured and placed on the market at a relatively low cost.

These and like objects of my invention will be better understood as the description proceeds and as is specifically pointed out in the appended claim.

Referring to the accompanying drawing which forms a part of this specification and which clearly illustrates the operation and construction of my improved nut lock, Figure 1 is a side elevation of a bolt having nut locks positioned thereon constructed in accordance with my invention, and showing the nuts bolted in a dotted position.

Figure 2 is a similar view with parts of the nut and bolt broken away to better illustrate the invention.

Figure 3 is a section taken on lines 3—3 of Fig. 1, and

Figure 4 is a section taken on lines 4—4 of Fig. 1.

Referring to the drawing in detail, like numerals will be used to designate like parts in the different views.

The numeral 1 indicates a bolt having a head 2 at one end and screw threads 3 on the opposite ends. Formed on opposite sides of the bolt and extending from the threaded end of same to where the thread terminates with the body 1 are grooves 4, the purpose of which will be better understood as the description follows.

Positioned on the threaded end 3 of the bolt 1 is my improved nut lock, which comprises members 5 and 6. As each of the members 5 and 6 are constructed similar, a description of one will be sufficient for both. A spring pawl 7 is inserted in the base of each of the members 5 and 6 as indicated by the numeral 8 and the free ends of the spring pawls or dogs are adapted to engage the longitudinal grooves 4 to securely hold the members 5 and 6 against reverse movement of the nuts after same are screwed onto the bolt 1.

From the foregoing description of my invention taken in connection with the accompanying drawing, it can readily be seen that if so desired only one of the members 5 or 6 could be used when it is desired to screw said member up against the base of the object to be held, but in case it is not desired to secure said locking member against said base, both members 5 and 6 are then used, and each of which are provided with apertures 9 and 10 formed in opposite corners of said members. As above stated when it is desired to lock the members 5 and 6 from the object being held on said bolt, the said object is adapted to be passed through said opening, which can be seen by looking at Fig. 1 of the drawings and the two members 5 and 6 will be securely held on the bolt by the spring pawls 7 and at the same time the pins passing through the apertures 9 and 10 will hold said members in spaced relation and prevent their turning on the threads of the bolt in the direction of the object held on said bolt.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts.

What I claim as new and desire to protect by Letters Patent is:—

In a nut lock comprising a bolt having longitudinal grooves, a pair of nuts positioned on said bolt, means carried by each of the nuts for engagement with the longitudinal grooves of the bolt and means for locking the nuts in a spaced relation with each other on said bolt to prevent rotation of said nuts in either direction.

In testimony whereof I affix my signature.

ANDY FTYKLO.